US009384621B1

(12) United States Patent
Chang

(10) Patent No.: US 9,384,621 B1
(45) Date of Patent: Jul. 5, 2016

(54) PRODUCT AND CUP DISPENSING MECHANISMS CONCENTRICALLY ARRANGED ON COMMON ROTATABLE WHEEL IN A SANITIZED VENDING MACHINE

(71) Applicant: Kil Jae Chang, Anyang (KR)

(72) Inventor: Kil Jae Chang, Anyang (KR)

( * ) Notice: Subject to any disclaimer, the term of this patent is extended or adjusted under 35 U.S.C. 154(b) by 37 days.

(21) Appl. No.: 13/999,532

(22) Filed: Mar. 7, 2014

Related U.S. Application Data

(63) Continuation-in-part of application No. 13/507,808, filed on Jul. 30, 2012, now Pat. No. 9,038,853.

(60) Provisional application No. 61/853,164, filed on Mar. 29, 2013.

(51) Int. Cl.
*B65G 59/00* (2006.01)
*B65H 1/00* (2006.01)
*G07F 11/62* (2006.01)

(52) U.S. Cl.
CPC .................................... *G07F 11/62* (2013.01)

(58) Field of Classification Search
CPC .......... G07F 11/62; G07F 13/10; G07F 11/44
USPC ............... 221/124, 92, 93, 95, 112, 113, 123, 221/133, 221
See application file for complete search history.

(56) References Cited

U.S. PATENT DOCUMENTS 1,311,170 A 7/1919 Lockwood et al.
1,666,008 A 4/1928 Graffenberger
1,952,447 A * 3/1934 Madden ................ G07F 13/065 141/107
2,370,848 A * 3/1945 Doggett ................. B65G 59/10 221/106
2,542,067 A * 2/1951 Waite ..................... B65G 59/10 221/104
2,559,063 A * 7/1951 Bremer ................... G07F 13/10 221/112
2,834,511 A 5/1958 Booth
2,880,906 A * 4/1959 Probasco ................ G07F 11/44 221/203
2,946,481 A * 7/1960 Carew .................. B65G 59/108 221/222
2,956,706 A * 10/1960 Sonheim ............. B65G 59/105 141/174
3,279,650 A 10/1966 Maxwell
3,618,642 A * 11/1971 Beaulieu ................. B65B 43/50 141/1

(Continued)

FOREIGN PATENT DOCUMENTS

FR EP 0562198 A1 * 9/1993 ............. G07F 13/10
GB 970093 A * 9/1964 ............. G07F 13/10

(Continued)

*Primary Examiner* — Rakesh Kumar
(74) *Attorney, Agent, or Firm* — John R. Flanagan

(57) ABSTRACT

A sanitized vending machine includes product and cup dispensing mechanisms and actuation mechanism. Product dispensing mechanism, holding one or more product items, rotates through a product dispensing cycle to dispense them. Cup dispensing mechanism, holding a stack of cups, rotates through a cup dispensing cycle to dispense a cup. Dispensing cycles occur in a predetermined sequence so as to enable dispensed product items to be received in a previously dispensed cup. Dispensing mechanisms are respectively disposed in a concentric relationship to one another on a single rotatable wheel so as to rotate together during respective dispensing cycles. Actuation mechanism includes a handle and rotatable drive gear drivingly interfaced with a driven gear on product dispensing mechanism such that when handle is turned by a user through an actuation cycle the drive gear rotates driven gear which concurrently rotates therewith the respective mechanisms through respective product and cup dispensing cycles.

9 Claims, 10 Drawing Sheets

(56) References Cited

U.S. PATENT DOCUMENTS

| | | | | | |
|---|---|---|---|---|---|
| 3,800,400 | A * | 4/1974 | Mistarz | B65B 3/027 | 221/211 |
| 3,849,970 | A * | 11/1974 | Kinney | B65B 43/44 | 221/222 |
| 4,094,345 | A * | 6/1978 | Deziel | B65B 1/06 | 141/174 |
| 4,158,426 | A * | 6/1979 | Frohbieter | F25C 5/007 | 222/1 |
| 4,618,073 | A * | 10/1986 | Bartfield | G07F 13/10 | 221/104 |
| 4,632,274 | A * | 12/1986 | Garbe | G07F 13/10 | 221/132 |
| 4,635,816 | A * | 1/1987 | Mikkelsen | G07F 13/10 | 221/105 |
| 4,655,266 | A * | 4/1987 | Ciekanski | A47J 31/401 | 141/104 |
| 4,742,937 | A | 5/1988 | Blom | | |
| 4,944,337 | A * | 7/1990 | Credle, Jr. | B67D 1/0021 | 141/103 |
| 5,029,737 | A * | 7/1991 | Yamamoto | F25C 5/007 | 222/146.6 |
| 5,172,828 | A * | 12/1992 | Ficken | G07F 13/10 | 221/105 |
| 5,400,838 | A * | 3/1995 | Schjerven | A47J 37/1271 | 141/129 |
| 6,053,359 | A * | 4/2000 | Goulet | B67D 1/00 | 141/174 |
| 6,378,724 | B1 * | 4/2002 | Chang | G07F 11/54 | 221/155 |
| 6,536,625 | B2 | 3/2003 | Chang | | |
| 7,066,351 | B2 | 6/2006 | Chang | | |
| 7,267,216 | B1 | 9/2007 | Chang | | |
| 7,743,942 | B1 * | 6/2010 | Chang | G07F 11/44 | 194/232 |
| 8,651,321 | B2 * | 2/2014 | Fu | G07F 11/24 | 221/119 |
| 8,839,987 | B2 * | 9/2014 | Doglioni Majer | G07F 13/10 | 141/168 |
| 9,038,853 | B2 * | 5/2015 | Chang | G07F 11/44 | 221/133 |
| 2005/0077311 | A1 * | 4/2005 | Chang | G07F 11/54 | 221/121 |

FOREIGN PATENT DOCUMENTS

| | | | | |
|---|---|---|---|---|
| GB | EP 0257751 | A2 * | 3/1988 | B65G 59/108 |
| GB | EP 0339946 | A2 * | 11/1989 | B65G 59/101 |
| JP | EP 0087141 | A2 * | 8/1983 | G07F 13/10 |

* cited by examiner

PRODUCT AND CUP DISPENSING MECHANISMS CONCENTRICALLY ARRANGED ON COMMON ROTATABLE WHEEL IN A SANITIZED VENDING MACHINE

CROSS-REFERENCE TO RELATED APPLICATION(S)

This patent application claims the benefit of U.S. Provisional Application No. 61/853,164 filed Mar. 29, 2013. The disclosure of said provisional application is hereby incorporated in its entirety herein by reference thereto.

This patent application is a continuation-in-part of co-pending U.S. Non-Provisional application Ser. No. 13/507,808, filed Jul. 30, 2012, published as U.S. Patent Application Pub. No. 2013/0048662 on Feb. 28, 2013, and issued as U.S. Pat. No. 9,038,853 on May 26, 2015.

BACKGROUND OF THE INVENTION

1. Field of the Invention

The present invention generally relates to vending machines and, more particularly, is concerned with a sanitized vending machine with product and cup dispensing mechanisms concentrically arranged with respect to each other upon a common rotatable wheel.

2. Description of the Background Art

Most prior art bulk coin-operated vending machines dispense their product items, such as candy or gum, into a non-removable cup fixed on, and ordinarily openable by manipulation of a pivotal flap mounted on the outside of, the housing of the machine which can be contacted and thus potentially contaminated by users' hands. The inventor of the subject matter disclosed herein has discerned that it is likely there are many potential users who would prefer alternative approaches for items to be dispensed from bulk vending machines so that the dispensed items cannot be contaminated through contact with parts of the vending machines which can be contacted and contaminated by users. An innovation which attempted to provide one alternative approach is disclosed in U.S. Pat. No. 7,066,351 by the inventor of the subject matter disclosed herein.

Another approach by the inventor herein is a first version of a sanitizing vending machine, which is the subject of the above-cited co-pending non-provisional patent application. The first version of the sanitizing vending machine and its method of operation is illustrated in attached FIGS. 1-9, 10A, 10B and 11-14.

As described hereinafter, the first version of the sanitizing vending machine has features that prevent all users from contaminating product items and parts of the machine that contact the product items, by only allowing the occurrence of certain actions within the machine and behind a locked external access door on the machine, and thus inaccessible to all users. These actions result in, first, dispensing a cup from a stack thereof, second, dispensing one or more selected product items from a supply thereof into the dispensed cup and, third, unlocking the access door to enable removal of the dispensed cup containing the product items. The dispensed cup with the product items can only be removed from the machine upon the door being unlocked due to a given user operating the machine to make a purchase through depositing the required coins into the machine and turning an external handle on the machine through a given actuating cycle.

While this first version of a sanitizing vending machine functions satisfactorily to prevent product contamination, it is perceived by the inventor of the subject matter disclosed herein that a need still exists for yet another approach to sanitized dispensing from bulk coin-operated vending machines.

SUMMARY OF THE INVENTION

The present invention provides a second version of a sanitized vending machine designed to overcome the above-described problem and satisfy the aforementioned need. The second version of the sanitizing vending machine, while continuing to employ many of the same components and features of the first version so as to only allow the occurrence of certain actions within the machine and behind a locked external access door on the machine and thus inaccessible to all users, modifies the separate tandemly-arranged, drivingly-interfaced, product and cup dispensing mechanisms into an integrated concentric arrangement on a single or common rotatable wheel, thereby saving in materials used and space occupied by the sanitized vending machine.

Accordingly, the present invention provides a sanitized vending machine which includes product and cup dispensing mechanisms and actuation mechanism. The product dispensing mechanism, holding one or more product items, rotates through a product dispensing cycle to dispense them. The cup dispensing mechanism, holding a stack of cups, rotates through a cup dispensing cycle to dispense a cup. The product and cup dispensing cycles occur in a predetermined sequence so as to enable dispensed product items to be received in a previously dispensed cup. The product and cup dispensing mechanisms are respectively disposed in an outer annular and inner central concentric relationship to one another on a single rotatable wheel so as to rotate together during the respective dispensing cycles. The actuation mechanism includes a handle and a rotatable drive gear drivingly interfaced with a driven gear on the product dispensing mechanism such that when the handle is turned by a user through an actuation cycle the drive gear rotates the driven gear which concurrently rotates therewith the respective mechanisms through their respective product and cup dispensing cycles.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

1. First Version of Sanitized Vending Machine (FIGS. 1-14)

Figure 2:
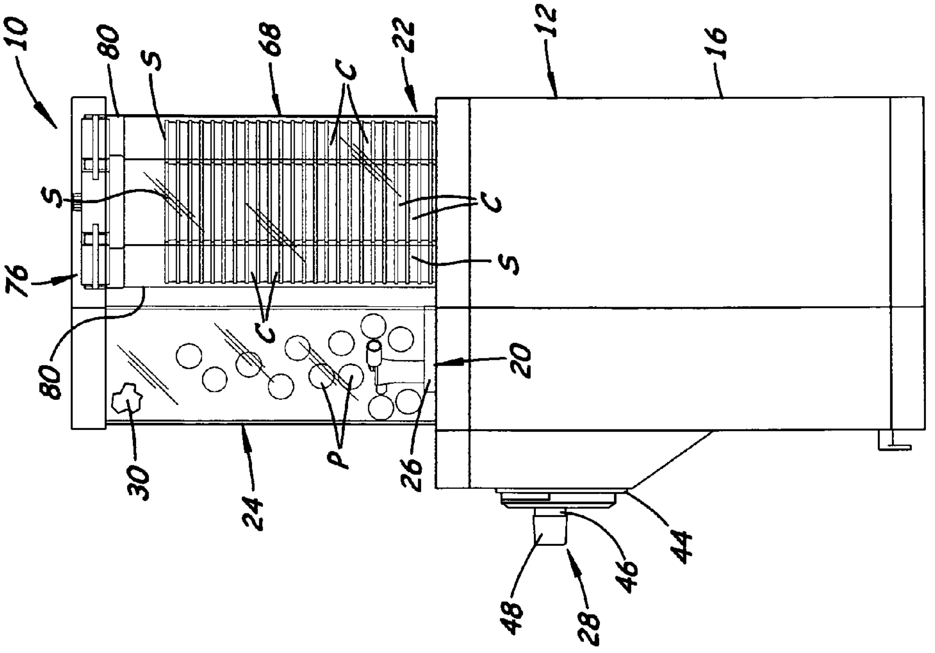
FIG. 2 is a side elevational view of the machine as seen along line 2-2 in FIG. 1.
Figure 1:
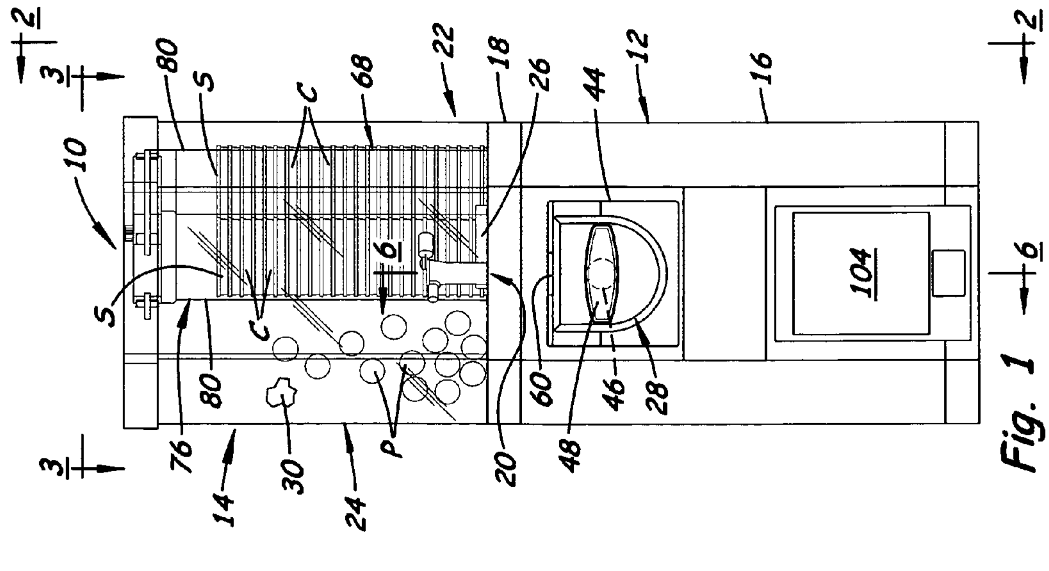
FIG. 1 is a front elevational view of an exemplary embodiment of a first version of a sanitized vending machine of the above-cited co-pending application.
Figure 3:
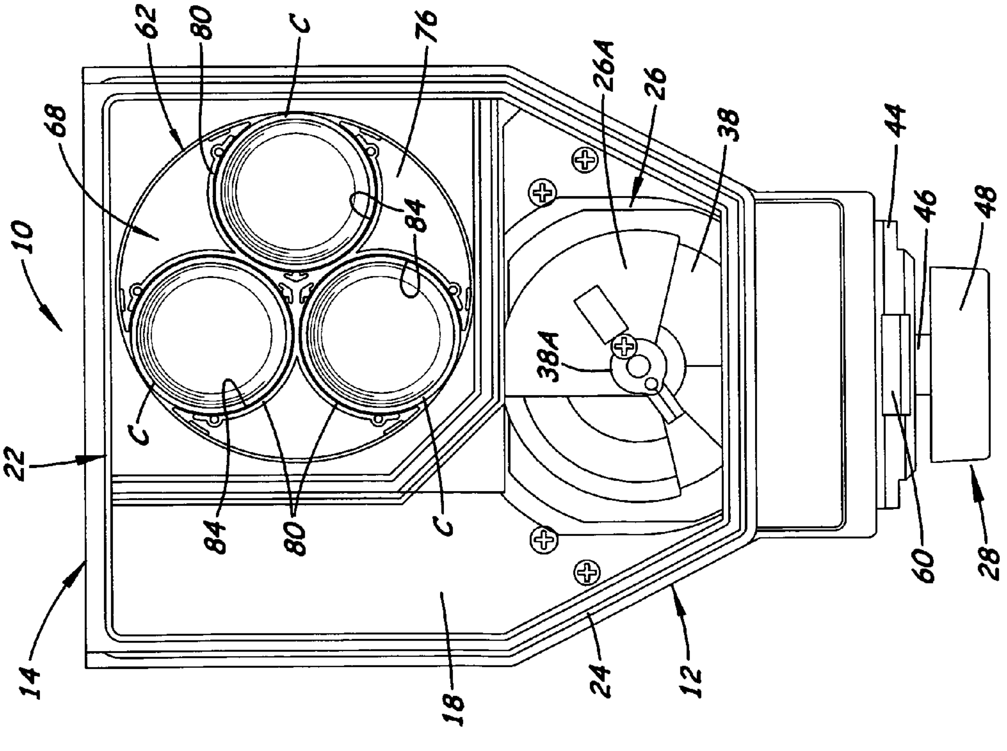
FIG. 3 is a top plan view of the machine as seen along line 3-3 in FIG. 1.

Referring to the drawings, and particularly to FIGS. 1-3, there is illustrated an exemplary embodiment of a first version of a coin-operated sanitized vending machine, generally designated 10. The first version of the sanitized vending machine 10 basically includes a housing 12 and a vending unit 14. The housing 12 includes an upright base 16 and substantially horizontal top platform 18 peripherally supported above the upright base 16 upon an upper edge thereof. The vending unit 14 includes a product vending apparatus 20 and a cup dispenser apparatus 22 interfaced and supported in a substantially tandem arrangement with one another by the top platform 18 of the housing 12 such that the cup dispenser apparatus 22 is located behind the product vending apparatus 20.

Referring to FIGS. 1-3, 5 and 6, the product vending apparatus 20 of the vending unit 14 includes a merchandise storage magazine 24, a product dispensing mechanism 26, and a coin-operated actuation mechanism 28. The merchandise storage magazine 24 is supported upright by the top platform 18 above the housing 12 and defines a chamber 30 adapted for holding a plurality of product items P to be dispensed one or more at a time. The top platform 18 of the housing 12 has a well structure 32 affixed about and depending below an interior edge 33 of the platform 18 defining an opening 34 in the top platform 18.

The product dispensing mechanism 26 includes a product dispensing device 38 disposed through a front portion 34A of the opening 34 and within a front cavity 36 of the well structure 32 above a front bottom wall 32A thereof. The product dispensing device 38 is rotatably supported by a central tubular portion 38A thereof which fits over a pedestal 32C attached on and extending upwardly from the front bottom wall 32A. The product dispensing device 38 underlies the chamber 30 of the storage magazine 24 to receive the predetermined number of product items from the storage magazine 24 into each compartment 38B of the product dispensing device 38 radially extending outwardly from and circumferentially displaced about the central tubular portion 38A thereof. Upon rotation of the product dispensing device 38 through 120° of a 360° circular path of travel during each product dispensing cycle, the product items received in a given one of the compartments 38B are successively carried by the product dispensing device 38 under a stationary cover portion 26A of the product dispensing mechanism 26 and across an opening 40 in the front bottom wall 32A of the well structure 32 at which the product items then fall (in other words, are dispensed) through the opening 40.

The product dispensing device 38 also includes a first driven gear 42 defined about its lower periphery portion 38C. The well structure 32 has an opening 32E at a front end of the front cavity 36 facing the rear of the coin-operated actuation mechanism 28 of the product vending apparatus 20. Front portions of the product dispensing device 38 and the first driven gear 42 project through the front end opening 32E of the well structure 32 so that the first driven gear 42 can maintain an operative interfaced or driven relationship with the coin-operated actuation mechanism 28 as will be described hereinafter.

Referring to FIGS. 1-4 and 6, the coin-operated actuation mechanism 28 includes a mounting plate 44, a shaft 46, a handle 48, a coin carrier 50 and a drive gear 52. The mounting plate 44 mounts the coin-operated actuation mechanism 28 to the base 16 of the housing 12 by seating into an open top slot (not shown) defined in the housing base 16 below the upper edge thereof and forwardly of the product dispensing mechanism 26. The shaft 46 is rotatably mounted through and by the mounting plate 44 such that outer and inner end portions 46A, 46B of the shaft 46 extend to and are disposed at the exterior and interior of the housing base 16. The handle 48 is attached on the outer end portion 46A of the shaft 46 and thus disposed at the exterior of the housing 12 where the handle 48 may be gripped and turned by a user. The drive gear 52 is attached on the inner end portion 46B of the shaft 46 and thus disposed in the interior of the housing 12. The coin carrier 50 is attached along the shaft 46 and disposed in the interior of the housing between and spaced from the handle 48 and the drive gear 52. A user upon turning the handle 48 concurrently causes rotation of the shaft 46, coin carrier 50 and drive gear 52 within the housing 12. A one-way ratchet gear 54 is formed on a rear face of a wheel 56 attached along the shaft 46 in the interior of the housing 12 between the coin carrier 50 and drive gear 52. The ratchet gear 54 is engaged by a spring-loaded pawl 58 so that the shaft 46 can only be rotated in one direction, namely counterclockwise, as viewed in FIG. 4, upon turning the handle 48 clockwise, as viewed in FIG. 1. A peripheral edge portion 56A of the wheel 56 extends radially outward beyond the ratchet gear 54 and is provided with a recess or notch 56B at a six o'clock position about the wheel peripheral edge portion 56A. The purpose of the notch 56B will be explained hereinafter.

During a given actuation cycle, at least one coin is deposited by a user through a coin slot 60 along the top of the mounting plate 44. The coin is received by the coin carrier 50 which holds the coin as the handle 48 is turned by the user and the shaft 46, coin carrier 50 and drive gear 52 therewith are rotated through a 360° path of travel during the given actuation cycle. The rotation of the coin carrier 50 transfers the coin to and releases it at a coin storage location (not shown) in the housing base 16. The rotation of the drive gear 52, which underlies and drivingly meshes, interfaces or engages directly with the first driven gear 42 on the rotatable dispensing device 38, causes rotation of the first driven gear 42 and thus the product dispensing device 38 therewith. The ratio of the sizes of the respective gears 42, 52 is such that the first driven gear 42 and thus the product dispensing device 38 rotate through 120° each dispensing cycle in response to rotation of the shaft 46 and drive gear 52 by the turning of the handle 48 through the entire 360° circular path of travel during the given actuation cycle. Thus, the dispensing of one or more product items occurs from a successive one of the compartments 38B of the product dispensing device 38 through the product dispensing opening 40 in the front bottom wall 34A of the well structure 34 during each actuation cycle of the coin-operated actuation mechanism 28 of the product vending apparatus 20 of the vending unit 14.

Referring to FIGS. 3 and 5-8, the cup dispenser apparatus 22 of the vending unit 14 includes a cup dispensing mechanism 62, outer and inner cup separator devices 64, 88, and a cup drop chute 66. The cup dispensing mechanism 62 includes a cup magazine or holder device 68 disposed within a rear cavity 70 of the well structure 32 and being rotatably supported on a central pedestal 32D affixed upright on a rear bottom wall 32B of the well structure 32 (which rear bottom wall 32B is at a level lower than the level of the front bottom wall 32A). The cup holder device 68 includes a lower holder part 74 that is rotatably fitted over and supported by the central pedestal 32D and also by an interior ledge 32F of the well structure 32 such that the lower holder part 74 is disposed in a spaced relationship above the rear bottom wall 32B of the well structure 32. The cup holder device 68 also includes an upper holder part 76 (FIGS. 1 and 2) that seats and is fastened upon internally-threaded posts 72 (FIGS. 5 and 9) affixed on and extending upright from the lower holder part 74. The upper holder part 76 is thereby carried by the lower holder part 74 along a 360° circular path of rotational travel. The upper holder part 76 extends upwardly through a rear portion 34B of the opening 34 in the top platform 18 to above the top platform 18 of the housing 12, as seen in FIGS. 1 and 2.

The cup holder device 68 also includes multiple lower tubular columns 78 in the lower holder part 74 and multiple upper tubular columns 80 in the upper holder part 76 (FIGS. 1 and 2). The multiple lower and upper tubular columns 78, 80, such as three in number, are vertically aligned with one another. The vertically aligned lower and upper tubular columns 78, 80 also are disposed side-by-side and angularly displaced 120° from one another. The lower and upper tubular columns 78, 80 in the lower and upper holder parts 74, 76 of the cup holder device 68 are open at their opposite ends so as to define passageways 82, 84 through the tubular columns 78, 80 that allow insertion of stacks of cups C through the upper open ends of the upper holder part 76 and also communicate at the lower open ends of the lower holder part 74 with the cup drop chute 66 of the apparatus 22 when successively aligned with a cup dispensing opening 86 in the rear bottom wall 32B of the well structure 32 located below a portion of the cup holder device 68. The lower tubular columns 78 also have vertical outer and inner slots 78A, 78B formed therein which extend between their opposite ends along their outer and inner sides. The inner slots 78B extend from their upper ends and terminate a short distance above their lower ends. The vertical inner slots 78B provide space for insertion and support of the inner cup separator device 88 upon the central pedestal 32D by use of a fastener 90 which extends through a central bore in the lower holder part 74 and threads into the central pedestal 32D. The inner cup separator device 88 cooperates with the outer cup separator device 64, as will be further described hereinafter, to control separation of each lowermost cup LC from its stack as the cup holder device 68 rotatably moves through 120° of the 360° circular path of travel.

The cup dispensing mechanism 62 also includes a second driven gear 92 defined about the lower periphery of the lower holder part 74 of the cup holder device 68 on the top side of a peripheral flange 74A on the lower holder part 74 that overlies an interior ledge 32F in the rear cavity 70 of the well structure 32. The well structure 32 has an opening 93 at the intersection between its front and rear cavities 36, 70 such that as the product dispensing device first driven gear 42 rotates through the 360° circular path of travel, a rear portion thereof and a front portion of the cup dispensing mechanism gear 92 project through the opening 93 between the cavities 36, 70 of the well structure 32 and directly drivingly intermesh, engage or interface with one another. Such intermeshing will cause rotation of the cup holder device 68 through 120° of the 360° circular path of travel, and thus operation of the cup dispenser apparatus 22 through a cup dispensing cycle, upon rotation of the shaft 46 and drive gear 52 thereon by the turning of the handle 48 of the coin-operated actuation mechanism 28 through the 360° circular path of travel of a given actuation cycle to thereby cause the dispensing of the predetermined number of product items from one of the compartments 38B of the dispensing device 38 through the product dispensing opening 40 in the front bottom wall 32A of the well structure 32 and dispensing of a cup from one of the lower tubular columns 78 of the lower holder part 74 of the cup holder device 68 through the cup dispensing opening 86 in the rear bottom wall 32B of the well structure 32 in a manner that a cup C with product P therein will be delivered to an accessible location of the vending unit 14, as will be described hereinafter.

Referring to FIGS. 5-8, the outer cup separator device 64 of the cup dispenser apparatus 22 is incorporated on a bracket 118 described hereinafter. The bracket 118 incorporating the outer cup separator device 64 has an arcuate configuration so as to extend through about a 150° portion of the 360° circular path of travel of the cup holder device 68 such that the bracket 118 overlies as well as is disposed both upstream and downstream of the cup dispensing opening 86 whereas the outer cup separator device 64 overlies and extends a short distance inwardly beyond the outer side of the cup dispensing opening 86 beginning at the upstream end thereof.

The outer cup separator device 64 and the top of the inner cup separator device 88 are disposed in a spaced relationship above the rear bottom wall 32B of the well structure 32 at a height slightly greater than the height of one cup C and in a stationary relationship to the rotatable cup holder device 68. The top level of the outer cup separator device 64 lies in a horizontal plane just below the bottom level of the upper holder part 76 and aligned with the upper level of the lower holder part 74. The outer cup separator device 64 at its inner edge portion 64A extends tangentially to and slightly inwardly across through the outer slots 78A as their respective lower tubular columns 78 rotate past the outer cup separator device 64. The portion of the outer cup separator device 64 that overlies the cup dispensing opening 86 has an arcuate-shaped cam segment 94 defined therealong with a wedge-shaped or tapered entry end 94A that will ensure separation of the lowermost cup C from the next cup C above it in the stack S. To prevent the remaining stack of cups above the lowermost cup LC from also falling downward through the cup dispensing opening 86, the top of the inner cup separator device 88 has a radially outward protruding circular rim portion 88A extending through about 180° opposite from and co-extensive with the inner edge portion 64A of the outer cup separator device 64, The top rim R of the next higher cup C above the lowermost cup C of the two stacks approaching and leaving the location of the cup dispensing opening 86 overlies the inner edge portion 64A of the outer cup separator device 64 and the opposing rim portion 88A of the inner cup separator device 88 so as to support the remaining stack of cups thereon. The rim portion 88A of the inner cup separator device 88 is cut away for about the remaining 180° thereabout so as to withdraw support from the remaining stack of cups during travel through that portion of its circular path opposite from the location of the outer cup separator device 64, allowing the new lowermost cup and remaining stack to drop down onto the rear bottom wall 32B of the well structure 32 such that the top rim R of the new lowermost cup will be just below and thus pass under the inner edge portion 64A of the outer cup separator device 64 as well as below the protruding rim portion 88A of the inner cup separator device 88 in preparation for engaging with the wedge-shaped or tapered entry end 94A of the depending cam segment 94 of the outer cup separator device 64.

The released cup drops downward through the funnel-shaped upper portion 66A of the cup drop chute 66 and into a substantially vertical lower portion 66B thereof until the top rim R of the released cup C encounters a plurality of circumferentially-spaced apart pivotal protrusions or ledges 96 inwardly biased by springs 98 and mounted on pins 100 in recesses 102 near the top of the lower portion 66B of the chute 66, upon which the released cup RC becomes temporarily seated at an intermediate position about midway down the cup pathway until the product items have dropped into the cup. The weight of the product in the cup is sufficient to overcome the bias of the springs 98 and cause the pivotal ledges 96 to pivot outwardly away from the cup C and allow the cup C with product items therein to drop to the final location behind an exterior access door 104 pivotally mounted on the front of the base 16 of the housing 12 of the vending unit 14 where cup C (FIG. 6) can be removed by the user opening the access door 104.

Figure 4:
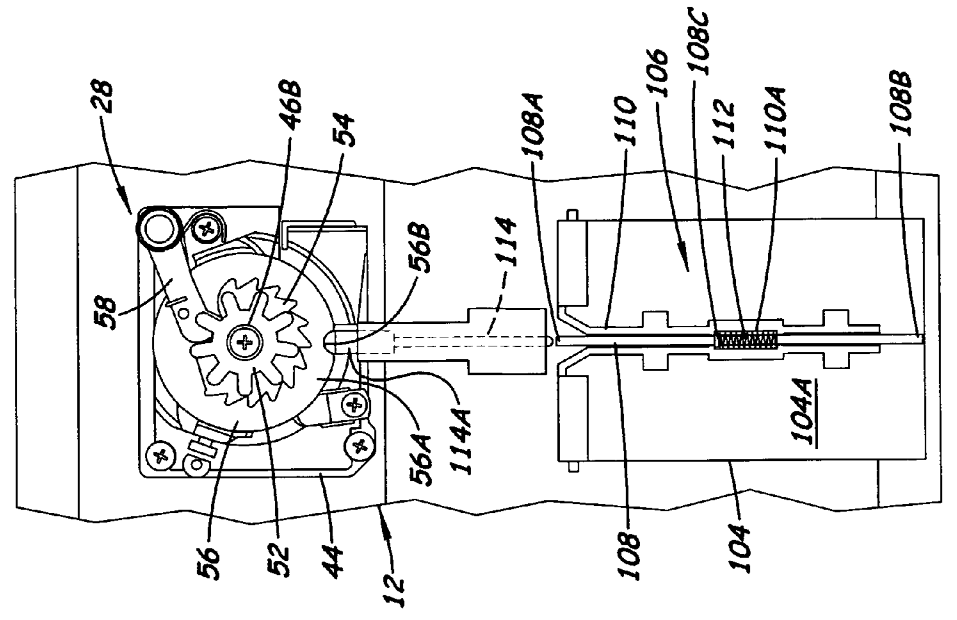
FIG. 4 is an enlarged fragmentary elevational interior rear view of the front of the machine.
Figure 6:
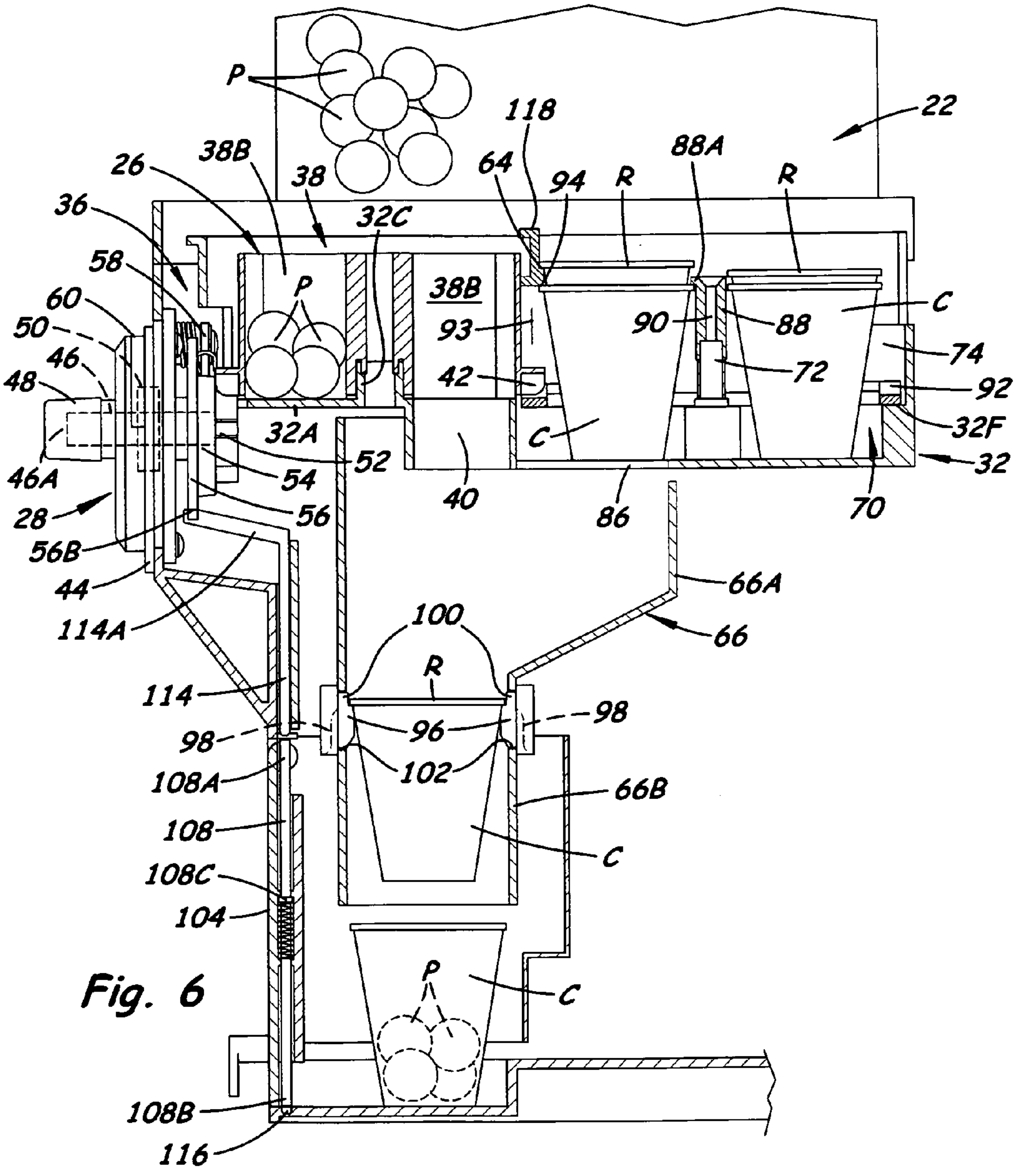
FIG. 6 is an enlarged vertically foreshortened view of the machine, with portions in sectional form, as seen generally along line 6-6 in FIG. 1.
Figure 7:
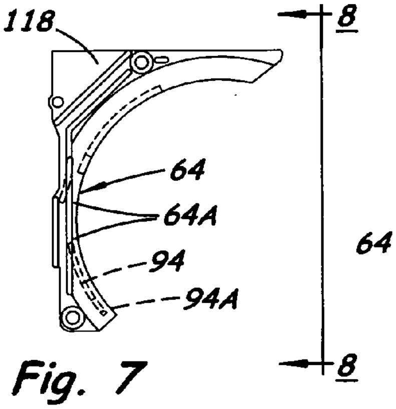
FIG. 7 is an enlarged top plan view of the outer cup separator device of FIGS. 5 and 6.
Figure 8:
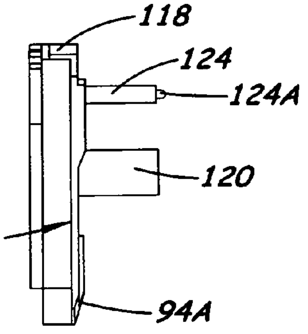
FIG. 8 is a side elevational view of the outer cup separator device as seen along line 8-8 in FIG. 7.

Referring to FIGS. 4 and 6, the vending unit 14 includes an access door locking mechanism 106 to control access of a user to the location in the base 16 behind the access door 104. The mechanism 106 maintains the access door 104 in a locked condition and thus disabled from providing access by a user until the handle 48 of the coin-operated actuation mechanism 28 is turned through the full 360° circular path of travel of a given actuation cycle such that upon reaching the end of the cycle the access door 104 is converted to an unlocked condition and may be opened by a user who then may reach in and remove the cup with the product items. The access door locking mechanism 106 includes an elongated rod 108 reciprocally mounted through a retainer member 110 secured on the inside surface 104A of the access door 104 and encircled by a spring 112 at a location intermediate the opposite upper and lower ends 108A, 108B of the rod 108. The spring 112 is disposed in a slot 110A in the retainer member 110 in a compressed condition between a collar 108C on the rod 108 and an end of the slot 110A so as to bias the rod 108 upwardly to place the access door 104 in an unlocked condition.

The access door locking mechanism 106 also includes a lock actuation device 114 reciprocally mounted in the base 16 of the housing 12 above and aligned with the rod 108. An upper arm portion 114A of the lock actuation device 114 underlies the peripheral edge portion 56A of the wheel 56 of the coin-operated actuation mechanism 18 such that the peripheral edge portion 56A engages the upper arm portion 114A and depresses the lock actuation device 114 and then the rod 108 downward against the bias of the spring 112 such that the lower end 108B is inserted into a hole 116 in the base 16 of the housing 12 below the access door 104, locking the door against being pivoted away from the housing 12. When the handle 48 of the mechanism 28 has been turned to the end of a complete 360° circular path of travel of a given actuation cycle, the upper arm portion 114A of the lock actuation device 114 becomes aligned with the notch 56B in the peripheral edge portion 56A of the wheel 56, allowing the upper arm portion 114A of the lock actuation device 114 and the rod 108 to move upward due to the bias force of the spring 112 and retract the lower end 108B from the hole 116 in the base 16 of the housing 12. The access door 104 can then be opened and the cup with product therein removed. This arrangement will ensure that the cup cannot be removed prematurely.

The flow of driving torque begins when, after a user deposits the appropriate number of coins into coin slot 60, the user turns the handle 48 of the mechanism 28 clockwise, as viewed in FIG. 1. Turning of the handle 48 rotates the shaft 46 and also rotates the actuation mechanism drive gear 52 and wheel 56 with the shaft 46, the rotation of the latter is counterclockwise as viewed in FIG. 4 which is in a direction opposite to that in FIG. 1. Rotation of the actuation mechanism drive gear 52 rotates the product vending apparatus first driven gear 42 and the product dispensing device 38 therewith which, in turn, rotates the cup dispenser apparatus second driven gear 92 and the cup holder device 68 therewith. The arrangements of the product dispensing device 38 and cup holder device 68 relative to their respective dispensing openings 40, 86 are such that each compartment 38B of the product dispensing device 38 travels over the product dispensing opening 40 before each passageway 82 through the lower holder part 74 of the cup holder device 68 travels over the cup dispensing opening 86; thus, the product items are dropped from the respective compartment 38B into the chute 66 before the cup is dropped from the respective passageway into the chute 66 during the same actuation cycle. However, the vending unit 14 is set up such that the cup released after the product items during the previous actuation cycle, since it is empty, is retained by the pivotal protrusions or ledges 96 at the intermediate position in the chute 66 and thus will receive product items during the succeeding actuation cycle. When the product items drop into the cup their weight added to the cup's weight is sufficient to force outward retraction of the ledges 96, against the opposed biasing force applied by the springs 98, thereby releasing the cup (with the product therein) from the ledges 96 and allowing it to drop to the discharge location behind the access door 104. The next cup then released subsequent to the product items during the same actuation cycle will be retained by the ledges 96, which will have immediately extended toward one another due to the biasing force applied by springs 98, for receiving product during the subsequent actuation cycle.

Figure 5:
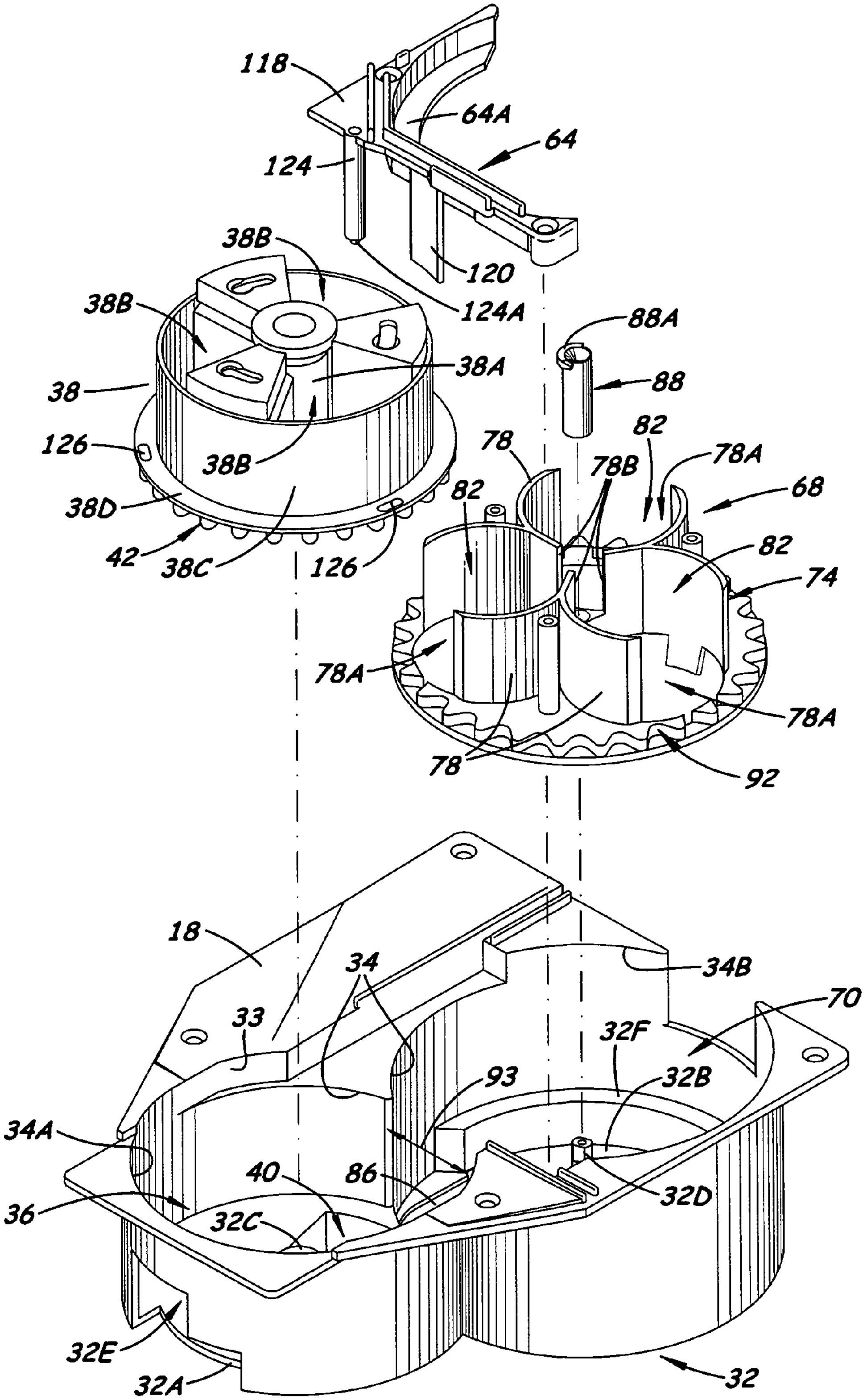
FIG. 5 is an exploded perspective view of a well structure, a product dispensing mechanism, a cup dispensing mechanism, and outer and inner cup separator devices employed in the machine as seen in FIG. 6.
Figure 9:
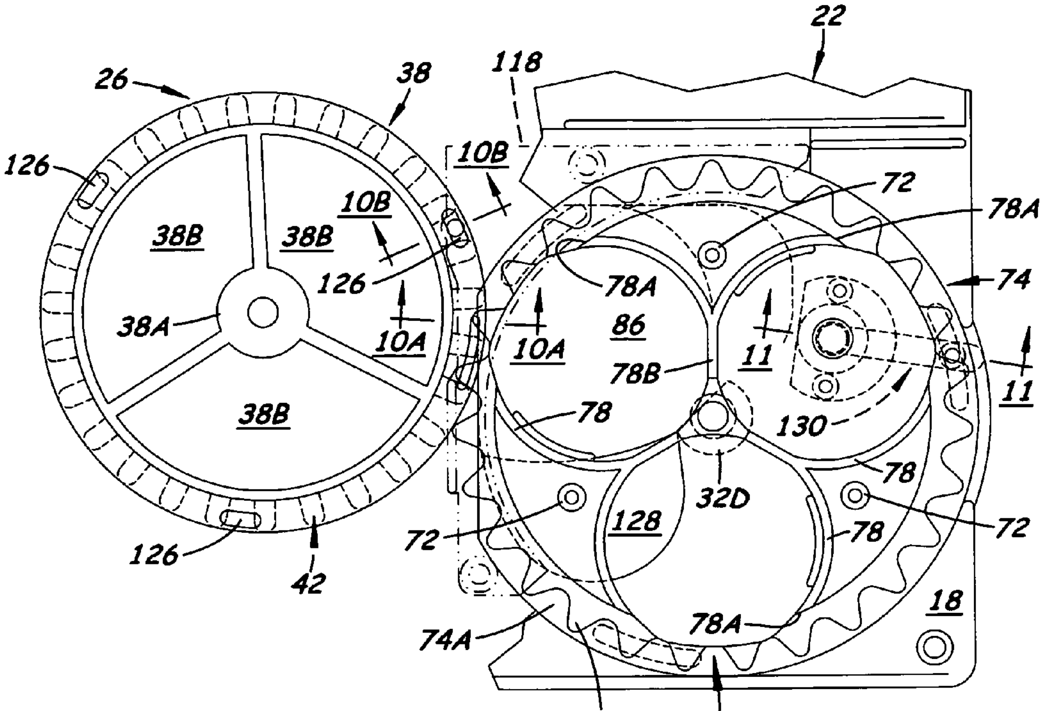
FIG. 9 is an enlarged top plan view of a peripheral first driven gear on the product dispensing device drivingly intermeshed with a peripheral second driven gear on the cup dispensing mechanism of the machine as seen in FIG. 6.
Figure 10A:
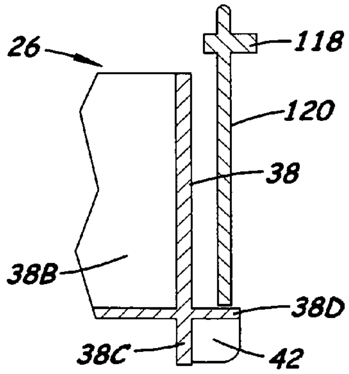
FIG. 10A is a sectional view of a separation restraint device arm taken along line 10A-10A in FIG. 9.

Referring now to FIGS. 5 and 9-14, there is illustrated five features for further enhancing the operation of the sanitized vending machine 10. Referring first to FIGS. 5, 9 and 10A, there is shown a bracket 118 mounted upon recessed shelves along the front and a side of the rear cavity 70 of the well structure 32 in overlying relation to the opening 93 at the intersection of the front and rear cavities 36, 70. Thus, the bracket 118 is spaced above the location of intermeshing of the gear 42 about the lower periphery of the dispensing device 38 with the second driven gear 92 on the lower periphery of the lower holder part 74 of the cup holder device 68. In addition to the above-described cup separator device 64, the bracket 118 incorporates a first of the five operation-enhancing features which is a separation restraint device in the form of an arm 120 attached to and depending from the bracket 118. As best seen in FIG. 10A, the arm 120 terminates just above and in a close positional relationship to an upper side of a flange 38D on the lower periphery portion 38C of the dispensing device 38. On the underside of the flange 38D is formed the first driven gear 42. The function of the depending arm 120 is to ensure that the first and second driven gears 42, 92 cannot separate from their interfacing relationship with one another and thus, in other words, to maintain the driving interfacing or intermeshing engagement of the first and second driven gears 42, 92 with one another.

Figure 10B:
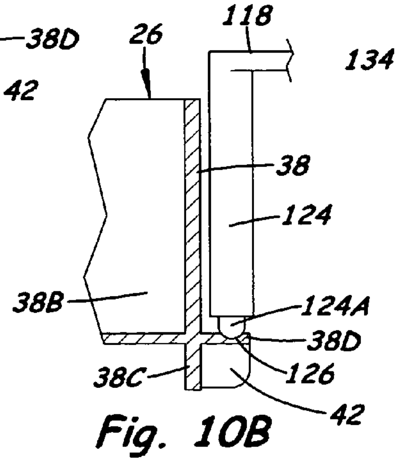
FIG. 10B is a sectional view of a position restraint device rod taken along line 10B-10B in FIG. 9.

Referring now to FIGS. 5, 9 and 10B, there is shown a second of the five operation-enhancing features which is a position restraint device in the form of a rod 124 having a spring-biased retractable tip 124A. The rod 124 is attached to and depends from the bracket 118 in a spaced relationship from the restraint arm 120 and generally parallel thereto. As best seen in FIG. 10B, the retractable tip 124A is spring biased to protrude downwardly into one of three depressions 126 formed at 120 degree intervals in the top of the flange 38D, marking the end of each product dispensing cycle so as to ensure that the dispensing device 38 is maintained in proper beginning alignment for the start of the next product dispensing cycle. The tip 124A is adapted to retract and permit rotation of the product dispensing device 38 in response to a subsequent actuation cycle.

Referring again to FIG. 9, there is also illustrated a third of the five operation-enhancing features which is in the form of a depression 128 formed in the rear bottom wall 32B of the well structure 32 at the upstream side of the cup dispensing opening 86 therein. The depression 128 ensures that the lowermost cup will release on time from the cup immediately above it as the one stack of cups is moved over the cup dispensing opening 86.

Figure 11:
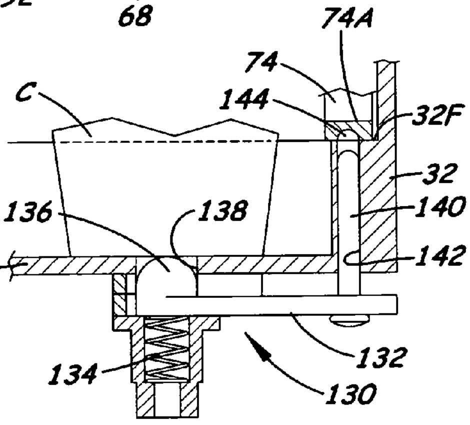
FIG. 11 is a sectional view of a cup stack depletion latching device employed in the machine taken along line 11-11 in FIG. 9.

Referring now to FIGS. 9 and 11, there is shown a fourth of the five operation-enhancing features in the form of a latching device 130 mounted to exterior of the rear bottom wall 32B of the well structure 32 downstream from the cup dispensing opening 86. The latching device 130 has a link 132 biased by a spring 134 to move upwardly toward the rear bottom wall 32B. The link 132 at an inner end has attached thereto a first pin 136 which extends through a hole 138 in the rear bottom wall 32B in the path of the stack of cups as they are moved in a circular path upon the wall 32B. The link 132 at an outer end has attached thereto a second pin 140 which extends through a slot 142 formed vertically through the interior ledge 32F on the wall 32B and underlying a peripheral flange 74A of the lower holder part 74 of the cup holder device 68. The second pin 140 is aligned to insert into any one of multiple (three) recesses 144 formed on the underside of the peripheral flange 74A of the lower holder part 74 of the cup holder device 68. The latching device 130 functions to detect depletion of any one of the stacks of cups and in response thereto to stop the ability of the cup holder device 68 to rotate and thereby prevent a user from being able to turn the handle 48 of the coin-operated actuation mechanism 28. The weight of a single last cup of the stack thereof will be enough to depress the first pin 136 and the link 132 and thereby retract the second pin 140 away from above the wall 32B and the recesses 144. However, when the last cup has been used, then the spring 134 causes the first and second pins 136, 140 and the link 132 to elevate and the second pin 140 to protrude into a corresponding one of the recesses 144 and thereby lock the cup holder device 68 in a fixed state.

Figure 12:
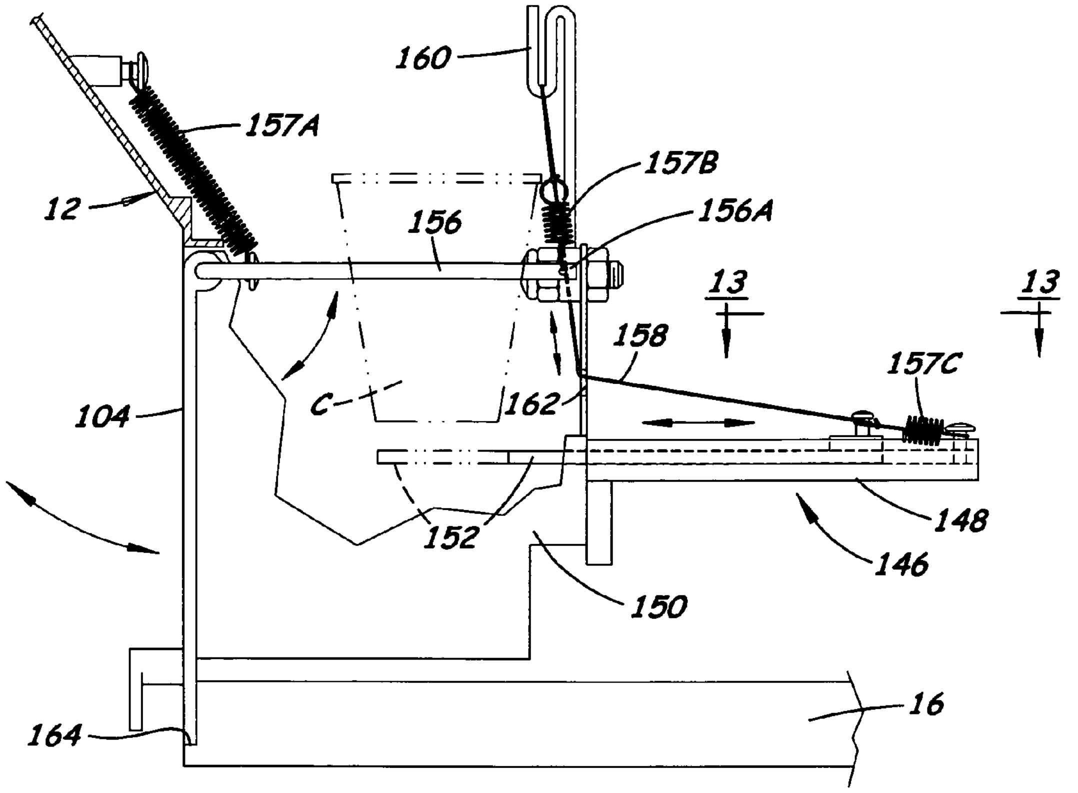
FIG. 12 is a fragmentary side elevational view of the machine with portions broken away to illustrate a cup shielding mechanism employed in the machine.
Figure 13:
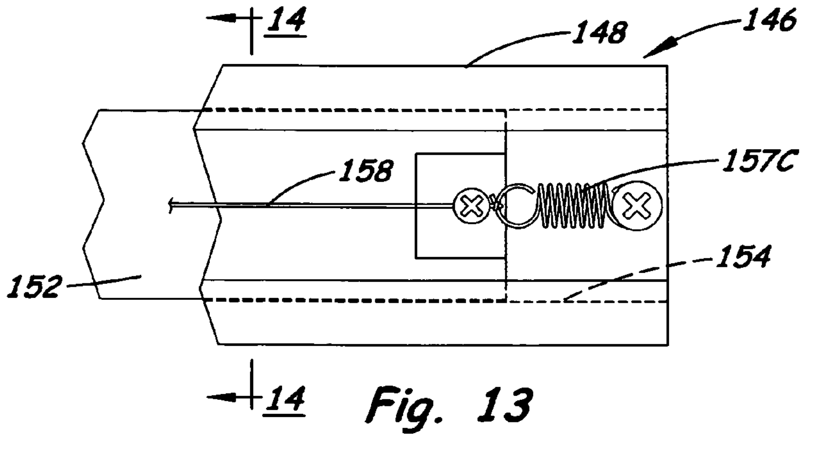
FIG. 13 is a fragmentary top plan view of the cup shielding mechanism as seen along line 13-13 in FIG. 12.
Figure 14:
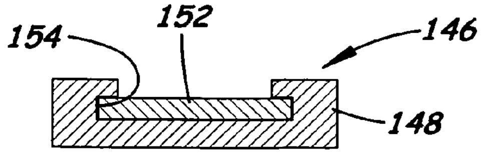
FIG. 14 is a cross-sectional view of the cup shielding mechanism taken along line 14-14 in FIG. 13.

Referring to FIGS. 12-14, there is illustrated a last of the five operation-enhancing features in the form of a cup shielding mechanism 146 which extends and obstructs access, when the unlocked access door 104 is opened by a user, to the next cup that is in position to receive product on the next dispensing cycle. The shield mechanism 146 includes a bed 148 mounted to extend from a bracket 150 upstanding from the base 16 of the housing 12, a track 154 formed on the topside of the bed 148 and a plank 152 slidably mounted in the track 154. The shield mechanism 146 also includes an arm 156 that is fixed to and extends outwardly from the door 104 such that the arm 156 moves with the door 104. The shield mechanism 146 further includes a first spring 157A anchored to the housing 12 and connected to the arm 156 so as to apply a bias force to the arm 156 tending to pivot the door 104 to a closed position as seen in FIG. 12. The shield mechanism 146 still further includes a second spring 157B and cable 158 connected to a rear end 156A of the arm 156 and extending therefrom upwardly and over an elevated hook 160, then downwardly to and through a hole 162 in the bracket 150, then rearwardly to where it is connected the rear end of the plank 152 (or, alternatively only a right angular arrangement of springs between the rear end 156A of the arm 156 and rear end of the plank 152 in place the second spring 157B, cable 158, elevated hook 160 and hole 162 in bracket 150), and a third spring 157C connected between a rear end of the bed 148 and the rear end of the plank 152. This arrangement will cause the plank 152 to slide forwardly to a position underlying the cup when the door 104 is pivoted open and then automatically retract when the door 104 is pivoted closed. This will prevent a user from being able to reach through the opening 164 in the housing 12 when the door 104 is open and contact the next cup and thereby attempt to disrupt the steps involved in filling the next cup with product and dropping it to onto the dispensing location.

2. Second Version of Sanitized Vending Machine (FIGS. 15-18)

Referring now to FIGS. 15-18, there is illustrated an exemplary embodiment of the second version of the coin-operated sanitized vending machine, generally designated 200, in accordance with the present invention. The second machine 200 continues to employ many components the same as or similar in structure and function to many of the components found in, and described above with respect to, the first machine 10, although in some instances their size and shape might be different. For example, the second machine 200 continues to have: a housing 202 similar to the housing 12; a merchandise storage magazine 204 similar to the merchandise storage magazine 24; a coin-operated actuation mechanism 206 similar to the coin-operated actuation mechanism 28; outer and inner cup separator devices 208, 210 similar to the outer and inner cup separator devices 64, 88; a cup holder device 212 similar to the cup holder device 68; a cup drop chute (not shown) similar to the cup drop chute 66; an access door locking mechanism (not shown) similar to the access door locking mechanism 106; a cup stack depletion latching device (not shown) similar to the cup stack depletion latching device 130; and a cup shielding mechanism (not shown) similar to the cup shielding mechanism 160. So these components of the second machine 200 are all more or less the same as the referenced components described earlier with respect to the first machine 10.

For the sake of brevity, only the modifications or changes incorporated in the second machine 200 will now be described. Basically, the second machine 200 does not employ the separate product and cup dispensing mechanisms 26, 62 of the first machine 10 with their respective separate, tandemly-arranged, drivingly-interfaced first and second driven gears 42, 92. Accordingly, the second machine 200 does not employ the front and rear cavities 36, 70 in the well structure 32 of the first machine 10 for supporting the separate product and cup dispensing mechanisms 26, 62, nor the separation and position restraint devices 120, 124 of the first machine 10 for maintaining the interfacing relationship and proper starting position alignment of the first and second driven gears 42, 92 of the product and cup dispensing mechanisms 26, 62.

Instead, in the second machine 200 an outer annular product dispensing mechanism 214 and an inner central cup dispensing mechanism 216 are integrated into a concentric arrangement with one another so as to form a single, or common, rotatably-supported wheel 218. The housing 202 has a top platform 220 with a well structure 222 affixed about and depending below an inwardly-sloping interior edge 220A of the platform 220. The well structure 222 has a peripheral outer side wall 224, a bottom wall 226 extending transversely to and connected to the peripheral side wall 224 and a top opening 228, defining an open single cavity 230 in the well structure 222. The single wheel 218 is disposed in the single cavity 230 of the well structure 222. The bottom wall 226 of the well structure 222 at a central location thereon fixedly supports a central pedestal 232 (FIG. 17) which rotatably supports the single wheel 218 at a central location thereon. An inner circular upright wall 234 formed on the bottom wall 226 of the well structure 222 is between an outer portion of the single wheel 218 associated with the outer annular product dispensing mechanism 214 and an inner portion of the single wheel 218 associated with the inner central cup dispensing mechanism 216. The bottom wall 226 of the well structure 222 has formed therein an outer product dispensing opening 236 (FIGS. 15 and 16) associated with the outer annular product dispensing mechanism 214 and an inner cup dispensing opening 238 (FIG. 17) associated with the inner central cup dispensing mechanism 216.

Figure 17:
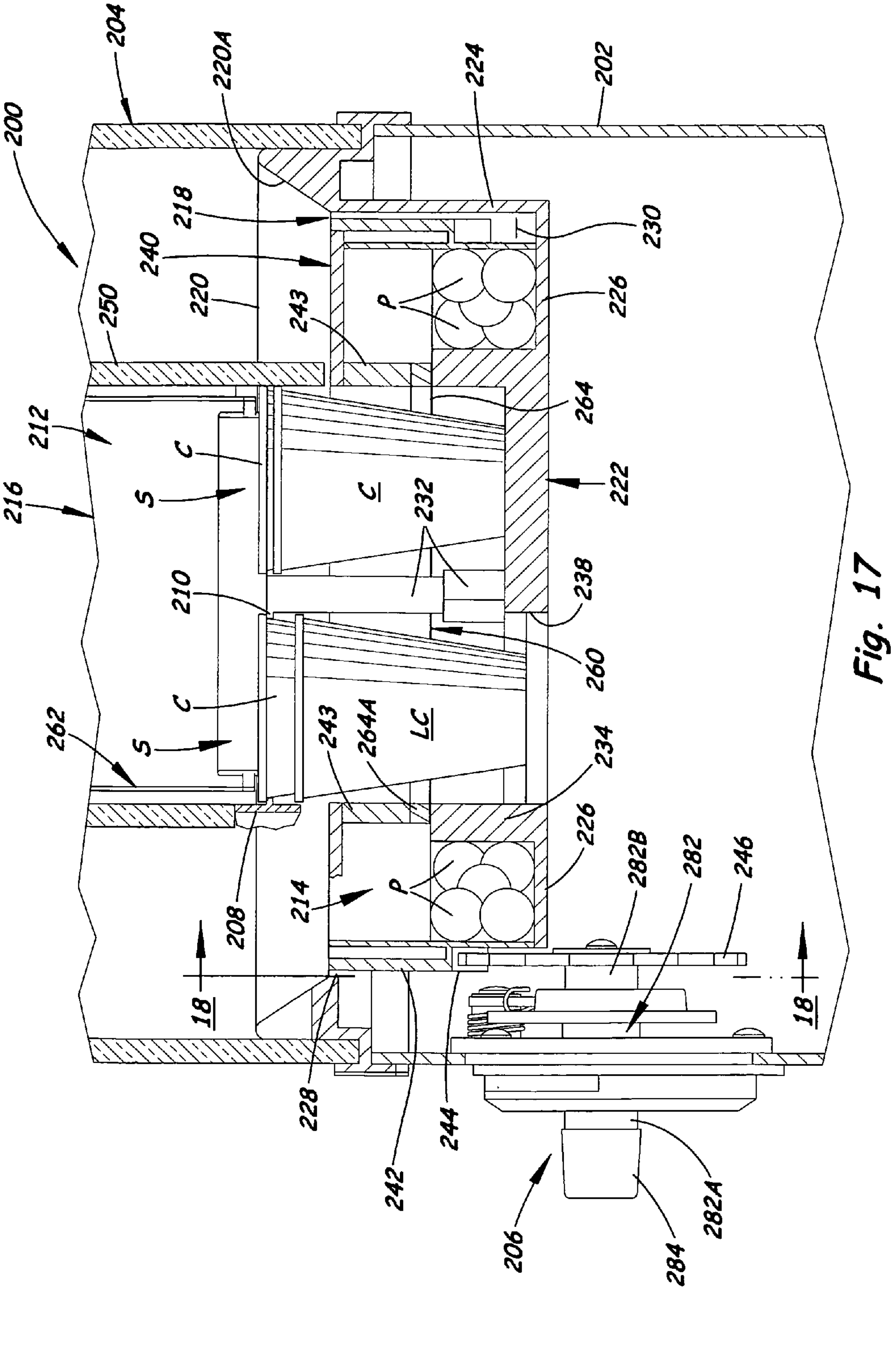
FIG. 17 is a fragmentary cross-sectional view of the machine taken along line 17-17 of FIG. 15.
Figure 18:
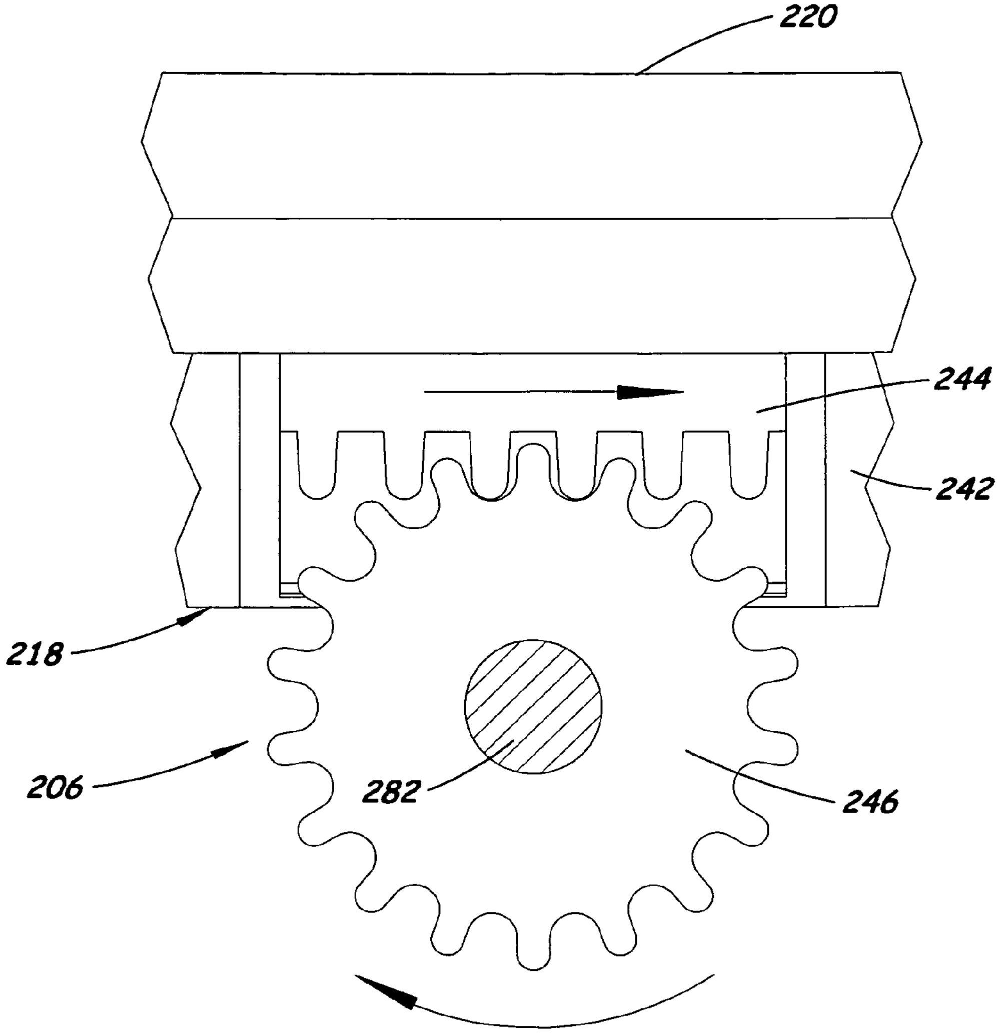
FIG. 18 is an enlarged view fragmentary view of the meshing gears of the machine taken along line 18-18 of FIG. 17.

As can be best seen in FIG. 17, the outer annular product dispensing mechanism 214 of the single wheel 218 has a top wall 240, an outer cylindrical sidewall 242, an inner cylindrical sidewall 243, and an outer annular driven gear 244. The outer and inner sidewalls 242, 243 extend into the single cavity 230 of the well structure 222. The outer cylindrical sidewall 242 has the outer annular driven gear 244 affixed on the circumferential exterior surface of the outer cylindrical sidewall 242. As seen in FIGS. 17 and 18, adjacent portions of the peripheral outer side wall 224 and bottom wall 226 at the front of the well structure 222 are removed so as to expose a segment of the outer annular driven gear 244 of the single wheel 218 and thereby position it in a driving interfacing relationship with a drive gear 246 of the actuation mechanism 206. Also, a central upright circular wall 250 of the stationary merchandise storage magazine 204 is spaced above the top wall 240 and inner cylindrical sidewall 243 of the outer annular product dispensing mechanism 214 of the single wheel 218.

More particularly, the top wall 240 is annular-shaped and extends across the top opening 228 of the well structure 222 above the outer portion thereof associated with the outer annular product dispensing mechanism 214 of the single wheel 218 such that the top wall 240 is separated into three sections 254 disposed in circumferentially-spaced relationship to one another. The three sections 254 of the top wall 240 are affixed to and extend between the outer and inner cylindrical sidewalls 242, 243 of the outer annular product dispensing mechanism 214. Also, fore-and-aft spaced pairs of end walls 256 are affixed to and extend between the outer and inner cylindrical sidewalls 242, 243 such that the outer and inner cylindrical sidewalls 242, 243, the three sections 254 of the top wall 240 and the end walls 256 define three product-receiving compartments 258, spaced circumferentially about 120° from another in the outer annular product dispensing mechanism 214 of the single wheel 222. The three product-receiving compartments 258 have no bottom except for the stationary bottom wall 226 of the well structure 222. The product items P in the compartments 258 thus rest on the stationary bottom wall 226 of the well structure 222 so that when the compartments 258 are moved relative to and one at a time across the product dispensing opening 236 with the circular movement of the single wheel 218 the product items P disposed therein upon the stationary bottom wall 226 slide along the stationary bottom wall 226 and dispense through the product dispensing opening 236. (The product items P in FIG. 17 are not actually in the compartments 258 and so are only shown there for purpose of illustrating them resting on the stationary bottom wall 226).

Figure 15:
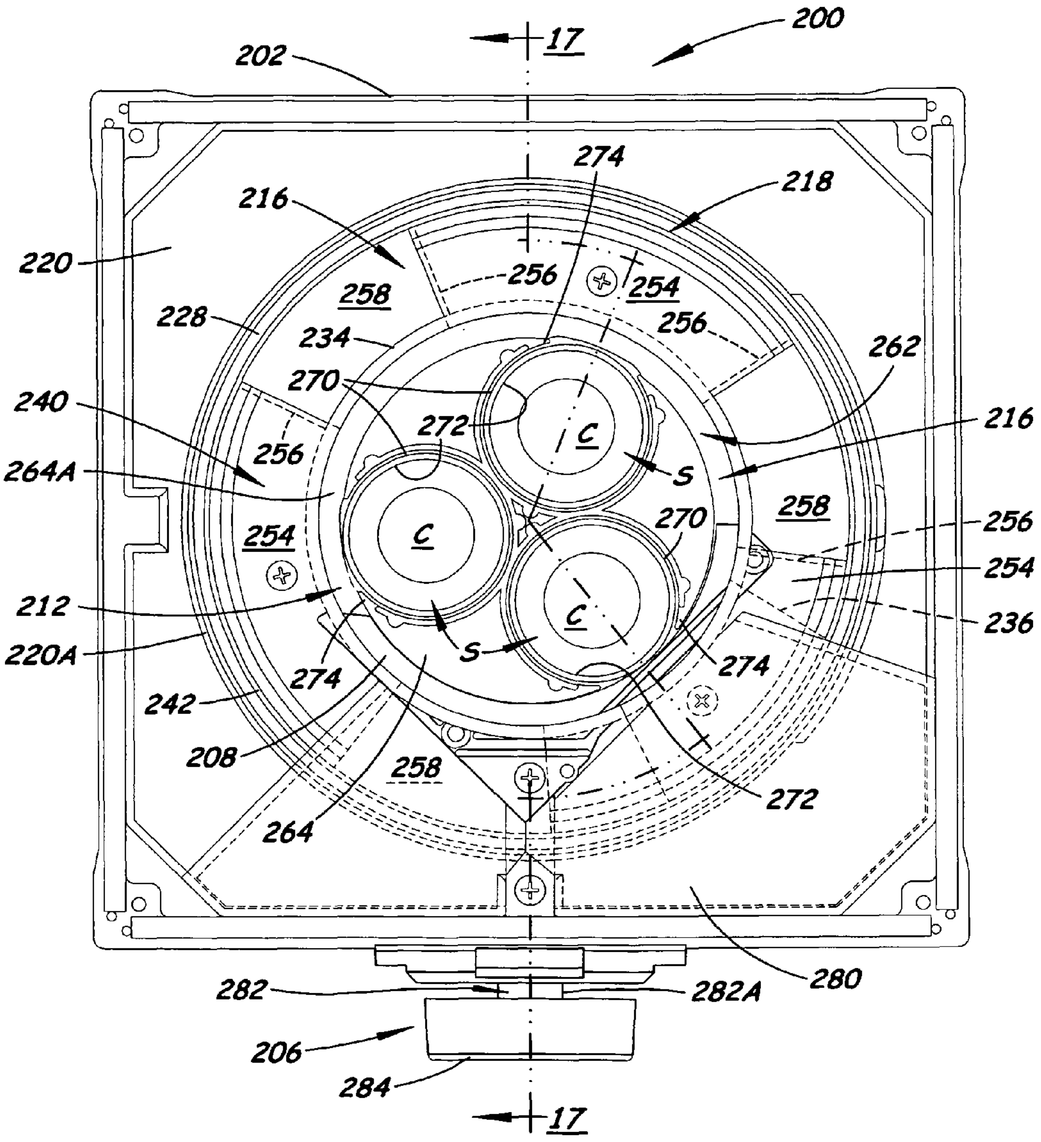
FIG. 15 is a top plan view of an exemplary embodiment of a second version of a sanitized vending machine in accordance with the present invention.
Figure 16:
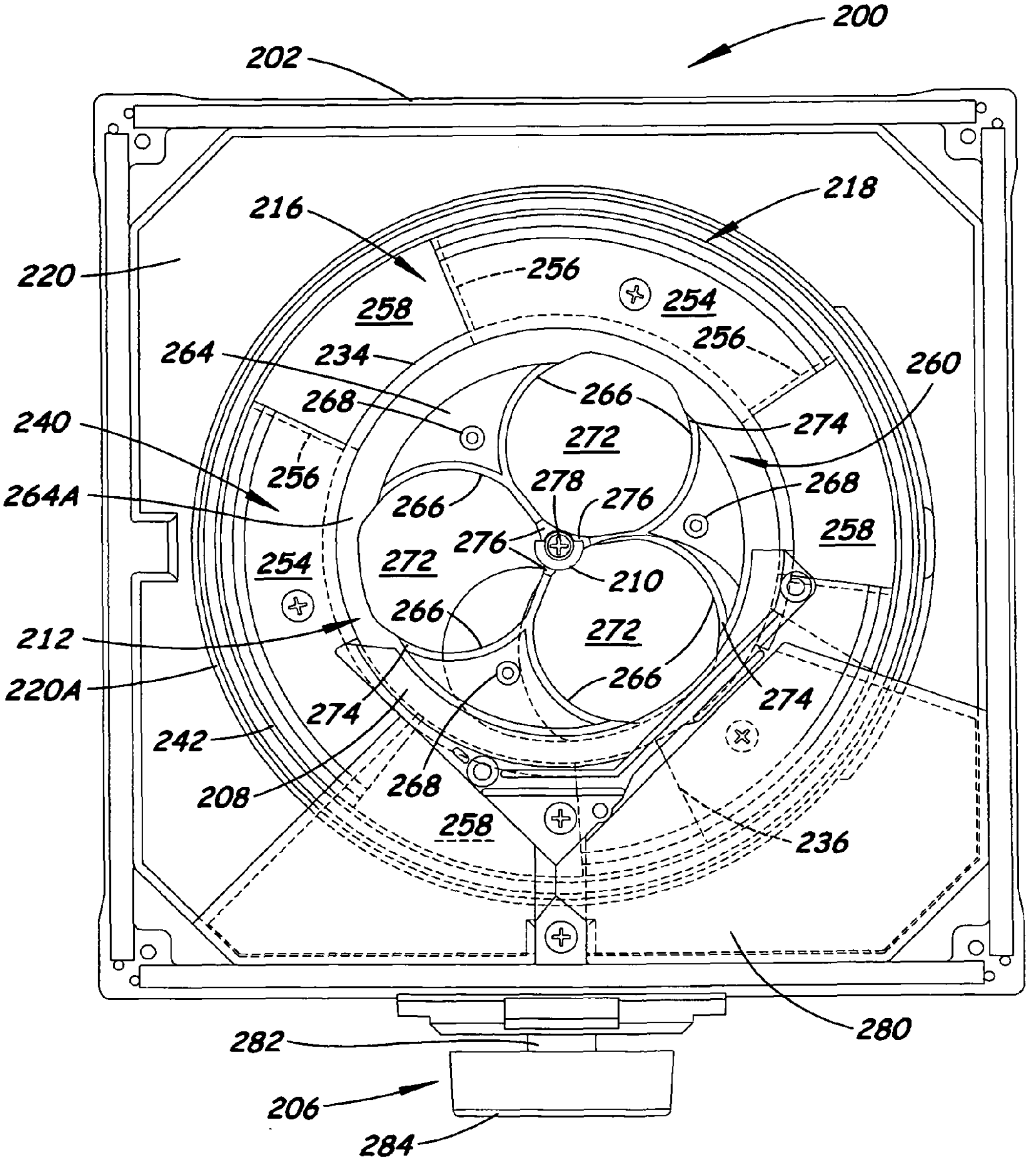
FIG. 16 is a top plan view on of the machine of FIG. 15 with a cup magazine removed.

Referring to FIGS. 15-17, there is shown the outer and inner cup separator devices 208, 210, and the cup holder device 212 of the inner central cup dispensing mechanism 216 of the single wheel 218. The cup holder device 212 has a lower holder part 260 and an upper holder part 262. The lower holder part 260 of the cup holder device 212 is in the form of a circular body 264 having multiple, for example three in number, back-to-back lower tubular columns 266 displaced from each other by about 120°. The lower holder part 260 also has multiple, for example three in number, internally-threaded posts 268 circumferentially spaced apart on the circular body 264, disposed between the lower tubular columns 266, and affixed on and extending upright from the circular body 264. A peripheral edge portion 264A of the circular body 264 of the cup holder device lower holder part 260 of the inner central cup dispensing mechanism 216 overlies, and is movable relative to, the stationary inner upright circular wall 234 of the well structure 222 and underlies and is affixed to the lower end of the inner cylindrical sidewall 243 of the outer annular product dispensing mechanism 214 such that the outer annular product dispensing mechanism 214 and inner central cup dispensing mechanism 216 are carried together by and thus rotate with the single wheel 218 relative to the stationary inner upright circular wall 234 of the well structure 222.

The upper holder part 262 is seated and fastened upon the posts 268 of the lower holder part 260 such that the upper holder part 262 is thereby carried by the lower holder part 260 along a 360° circular path of rotational travel. The upper holder part 262 extends upwardly through the top opening 228 of the well structure 222 to above the top platform 220, as seen in FIG. 17. The upper holder part 262 of the cup holder device 212 has multiple, for example three in number, back-to-back upper tubular columns 270 displaced from each other by about 120°, each for holding a stack S of cups C.

The lower tubular columns 266 of the lower holder part 260 and the upper tubular columns 270 of the upper holder part 262 are vertically aligned with one another such that the stacks S of cups C extend downward into and through the lower tubular columns 266 of the lower holder part 260, as seen in FIG. 17. The vertically-aligned lower and upper tubular columns 266, 270 in the lower and upper holder parts 260, 262 of the cup holder device 212 have vertically-aligned passageways 272 and outer vertically-aligned side slots 274 defined through them between their opposite ends that allow insertion of stacks S of cups C through upper open ends of the upper holder part 262 and extension of the stacks S from lower open ends of the lower holder part 260. The passageways 272 communicate at the lower open ends of the lower holder part 260 with the cup drop chute (see chute 66 in FIG. 6 with respect to the first machine 10) of the second machine 200 when successively aligned with the cup dispensing opening 238 in the bottom wall 226 of the well structure 222 located below a portion of the cup holder device 212, as seen in FIGS. 16 and 17. The lower tubular columns 266 also have vertically-extending inner side slots 276 which extend from their upper ends and terminate a short distance above their lower ends. The vertical inner side slots 276 provide space for insertion and support of the inner cup separator device 210 upon the central pedestal 232 by use of a fastener 278 which extends through a central bore in the lower holder part 260 and threads into the central pedestal 232. The inner cup separator device 210 cooperates with the outer cup separator device 208, as will be further described hereinafter, to control separation of each lowermost cup LC from its stack S as the cup holder device 212 is rotatably moved through 120° of the 360° circular path of travel.

As described above, the outer annular product dispensing mechanism 214 of the single wheel 218 has a product dispensing arrangement in the form of multiple, for example three in number, product-receiving compartments 258 displaced from each other by 120° (and 60° from the vertically-aligned lower and upper tubular columns 266, 270 holding cup stacks S), and communicating through the top opening 228 of the well structure 22 for receiving and holding groups of product items P from the merchandise storage magazine 204 overlying the compartments 258. The outer annular product dispensing mechanism 214 also includes a stationary cover 280 spaced above the product dispensing opening 236 in the bottom wall 226 of the well structure 222 and the one of the compartments 258 approaching the product dispensing opening 236. The stationary cover 280 covers and shields such one compartment 258 and the product dispensing opening 236 so as to prevent any additional product items P above the stationary cover 280 from dropping into the one compartment 258 and through the product dispensing opening 236. The outer cup separator device 208 is supported along the inner edge of the stationary cover 280 so as to extend along a peripheral portion of the cup holder device 212 below the lower end of the upper holder part 262 of the cup holder device 212 and adjacent to and spaced above the outer side of the cup dispensing opening 238 as the same height as the inner cup separator device 210. The stationary cover 280 (not shown in FIG. 17) may be supported from front portion of the housing 202 at the periphery of the top platform 220 thereof so as to, in turn, support the upright circular wall 250 of the magazine 204.

Referring again to FIGS. 15-18, the same as in the first machine 10, at the start of each actuation cycle a cup C is retained at the intermediate position in the cup drop chute (see chute 66 in FIG. 6 with respect to the first machine 10) from a previous actuation cycle. The actuation mechanism 206 has a drive shaft 282 rotatably mounted through the housing 202 of the machine 200, with a handle 284 attached on the exterior end 282A of the drive shaft 282 and the drive gear 246 of the actuation mechanism 206 attached on the interior end 282B of the drive shaft 282. Thus, as the single integrated product and cup dispensing wheel 218 is rotated via meshing engagement of its outer annular driven gear 244 with the drive gear 246, as seen in FIG. 18, by turning the handle 284 and hence the drive shaft 282 of the actuation mechanism 206 clockwise during a given actuation cycle, a next one of the compartments 258 passes under the stationary cover 280 and over the product dispensing opening 236, allowing the product items to drop from the next one compartment 258 into the cup drop chute and thus into the cup being held at the intermediate position. The full cup then drops from the intermediate position to the lower final position behind the access door (as seen in FIG. 6 with respect to the first machine 10). As the single wheel 218 continues to rotate by continued turning of the handle 284 to the end of the given actuation cycle, a lowermost one of the cups in the next one of vertically-aligned lower and upper tubular columns 266, 270 of the cup holder device 212 that approaches the cup dispensing opening 238 is separated from its stack by the operation of the outer and inner cup separator devices 208, 210 (as seen in FIG. 17), allowing the cup to drop down into the cup drop chute and be retained at the intermediate position (as shown in FIG. 6 with respect to the first machine 10) at the end of the given actuation cycle in preparation of the next actuation cycle to start. The clockwise turning of the handle 284 (in the direction of the arcuate arrow below the drive gear 246 in FIG. 18) through a complete 360° actuation cycle will rotate the single wheel 218 counterclockwise (in the direction of the straight arrow on the driven gear 244 also in FIG. 18) through a displacement of about 120°. Thus, the locations or spacing of the product and cup dispensing openings 236, 238 relative to one another are selected to allow, during the same given cycle, the product to be dispense first into the cup retained at the intermediate position in the cup drop chute and last the next cup to be dispensed thereafter so that the dispensed cup will be waiting at the intermediate position when the dispensed product arrives during the next actuation cycle.

It is thought that the present invention and its advantages will be understood from the foregoing description and it will be apparent that various changes may be made thereto without departing from the spirit and scope of the invention or sacrificing all of its material advantages, the forms hereinbefore described being merely exemplary embodiments thereof.

What is claimed is:

1. A sanitized vending machine, comprising:

a rotatably-mounted wheel having a driven gear peripherally arranged thereon, said wheel including an outer annular product dispensing mechanism adapted to hold a plurality of product items and being supported for undergoing rotation through a product dispensing cycle during which said product dispensing mechanism dispenses one or more of product items;

an inner central cup dispensing mechanism adapted to hold at least one stack of cups and being supported for undergoing rotation concurrently with said outer annular product dispensing mechanism through a cup dispensing cycle during which said inner cup dispensing mechanism dispenses a cup from the stack to a predetermined position, said respective product and cup dispensing cycles occurring in a predetermined sequence so as to enable the dispensed product items to be received in a cup previously dispensed to the predetermined position, said inner central cup dispensing mechanism being disposed into a concentric arrangement with said outer annular product dispensing mechanism such that said outer annular product dispensing mechanism surrounds said inner central cup dispensing mechanism and said outer annular product and inner central cup dispensing mechanisms undergo concurrent rotation in a common circular direction during said respective product and cup dispensing cycles;

an actuation mechanism including a rotatable shaft, a drive gear mounted to said shaft so as to undergo rotation with said shaft, said drive gear being drivingly interfaced with said driven gear of said wheel, and a handle mounted to said shaft and adapted to be turned to rotate said shaft and said drive gear therewith through an actuation cycle such that when said handle is turned by a user through the actuation cycle said driven gear rotates said wheel and said outer annular product and inner central cup dispensing mechanisms through said respective product and cup dispensing cycles; and a well structure including an outer peripheral sidewall and a bottom wall defining a cavity having an open top, said sidewall having an opening adjacent said actuation mechanism enabling said drive gear of said actuation mechanism to drivingly interface with said driven gear of said wheel;

wherein said well structure also includes an outer product dispensing opening defined in said bottom wall and underlying said outer annular product dispensing mechanism, and an inner cup dispensing opening defined in said bottom wall and underlying said inner central cup dispensing mechanism.

2. The machine of claim 1 further comprising:

a product storage magazine disposed above said outer annular product dispensing mechanism such that one or more product items due to the force of gravity drop into a compartment of said product dispensing mechanism to provide one or more of product items in said compartment precedent to said product dispensing mechanism undergoing rotation during the product dispensing cycle.

3. The machine of claim 1 wherein said cup dispensing mechanism includes a cup holder device adapted to hold at least one stack of cups and dispense the same through the cup dispensing opening due to the force of gravity upon rotation of said cup holder device with said product dispensing mechanism during a cup dispensing cycle.

4. The machine of claim 1 further comprising:

an outer cup separator device and an inner cup separator device disposed in a spaced relation to one another and adapted to separate a lowermost cup from the stack in a cup holder device of said cup dispensing mechanism so as to enable dispensing the separated cup due to the force of gravity through the cup dispensing opening upon rotation of said cup holder device during the cup dispensing cycle.

5. The machine of claim 4 further comprising:

a depression formed in said bottom wall of said well structure at an upstream side of said cup dispensing opening to ensure that the lowermost cup will release on time from the cup immediately above it as the slack of cups is moved over said cup dispensing opening.

6. The machine of claim 1 further comprising:

a cup drop chute disposed below and in communication with the product dispensing opening in said bottom wall of said well structure and the cup dispensing opening in said bottom wall of said well structure, said cup drop chute adapted to guide a cup dispensed through said cup dispensing opening to the predetermined position at an intermediate location in said drop chute, between said cup dispensing opening and a discharge location below said cup drop chute, where the cup is temporarily retained awaiting dispensing of product items therein, said cup drop chute also adapted to guide into the temporarily retained cup the predetermined number of product items dispensed from the product dispensing opening, and said cup drop chute further adapted to release the temporarily retained cup with the predetermined number of product items therein and guide the same to the discharge location below said cup drop chute.

7. The machine of claim 6 further comprising:

an access door mounted adjacent to the discharge location and movable between open and closed positions to provide access by a user to a cup containing product items resting at the discharge location; and an access door locking mechanism coupled to said actuation mechanism and adapted to maintain said access door in a locked condition at a closed position until said handle of said actuation mechanism has been turned by a user through the actuation cycle whereupon said access door is converted to an unlocked condition permitting a user to open said access door and remove the cup containing product items.

8. The machine of claim 7 further comprising:

a cup shielding mechanism disposed below said cup drop chute and adapted to obstruct a user through the access door open at the end of a given actuation cycle from being able to reach a cup disposed at the intermediate location in said cup drop chute to receive product items during a next actuation cycle.

9. The machine of claim 1 further comprising:

a latching device disposed adjacent to said cup dispensing mechanism and adapted to detect depletion of the stack of cups and in response thereto stop said wheel from being rotated and thereby prevent a user from being able to turn said handle of said actuation mechanism.

* * * * *